United States Patent [19]

Newirth et al.

[11] 4,212,161

[45] Jul. 15, 1980

[54] SIMULATED PARAMETER CONTROL FOR GAS TURBINE ENGINE

[75] Inventors: David M. Newirth, Vernon; Eugene W. Koenig, East Hartford, both of Conn.

[73] Assignee: United Technologies Corporation, Hartford, Conn.

[21] Appl. No.: 901,899

[22] Filed: May 1, 1978

[51] Int. Cl.³ .............................. F02C 9/28; F02C 9/44
[52] U.S. Cl. ................................. 60/39.28 R; 364/805
[58] Field of Search .................. 60/39.09 R, 39.28 R, 60/223; 364/803

[56] References Cited

U.S. PATENT DOCUMENTS

| | | |
|---|---|---|
| 2,809,492 | 10/1957 | Arkawy .......................... 60/39.28 R |
| 3,420,056 | 1/1969 | Eames ............................ 60/39.28 R |
| 3,851,157 | 11/1974 | Ellis ................................ 60/39.28 R |
| 4,058,975 | 11/1977 | Gilbert et al. .................. 60/39.28 R |
| 4,122,667 | 10/1978 | Hosaka et al. ................. 60/39.09 R |

*Primary Examiner*—Louis J. Casaregola
*Attorney, Agent, or Firm*—Norman Friedland

[57] ABSTRACT

For a failure of a sensor utilized in the controls for a gas turbine engine, calculations from other parameters based on the thermodynamics of the cycle serve to simulate the value otherwise manifested by the failed sensor. In this instance, the ratio of burner pressure to engine inlet total pressure generated as a function of corrected rotor speed multiplied by a calculated engine total pressure from aircraft altitude and Mach No. simulates burner pressure utilized in the main fuel control for continuing automatic engine operation.

2 Claims, 1 Drawing Figure

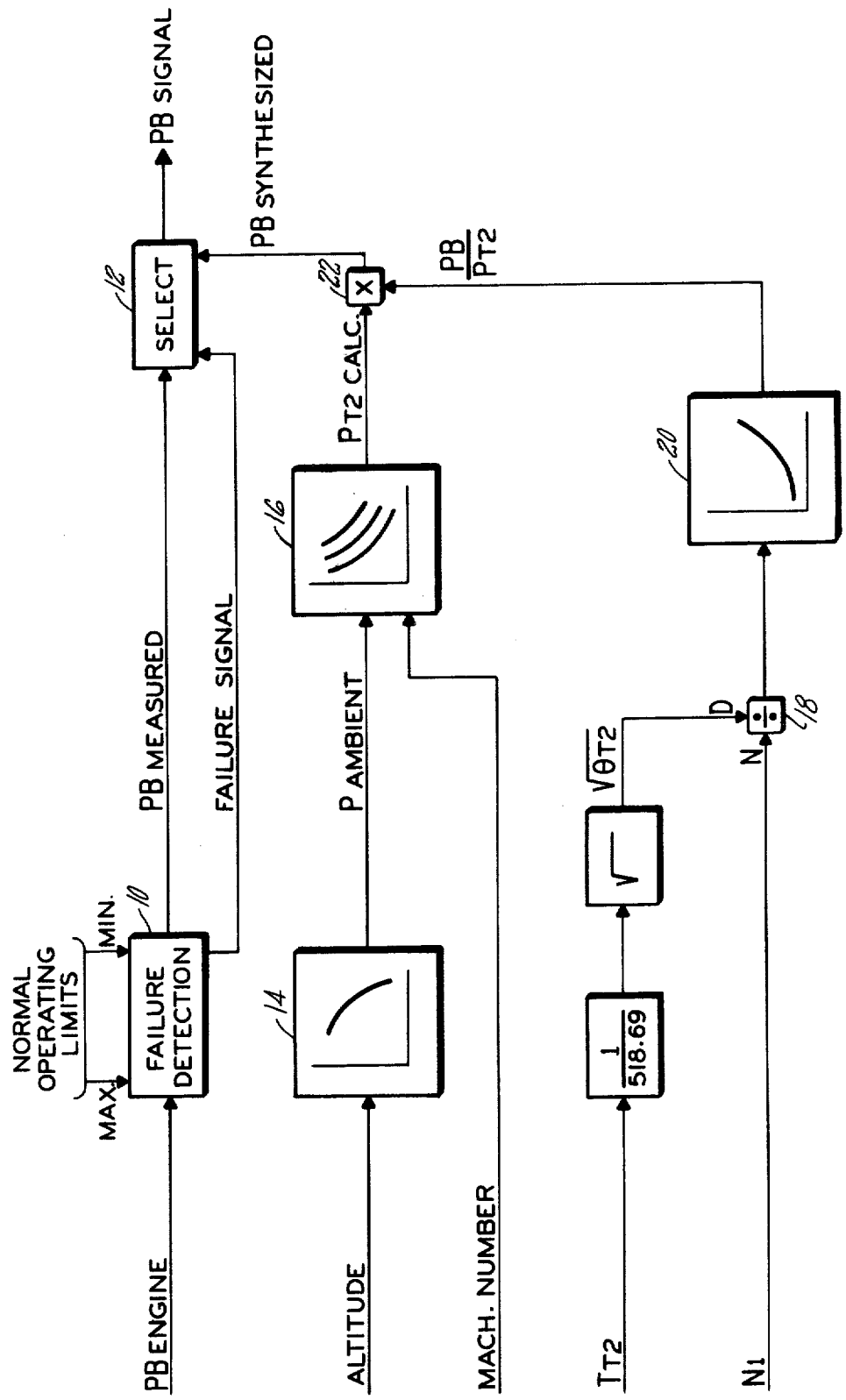

SIMULATED PARAMETER CONTROL FOR GAS TURBINE ENGINE

BACKGROUND OF THE INVENTION

This invention relates to controls for turbine type power plants and more particularly to means for synthesizing a failed sensor to avoid engine shutdown or damage.

The apparent consequence of a failed sensor in the engine control is failure or shutdown of the engine. Obviously, such a consequence is to be avoided if at all possible. Attempts have been made to account for failed sensors particularly as a result of the advent of digital computers. For example, U.S. Pat. No. 3,851,157 granted to S. H. Ellis on Nov. 26, 1974, and assigned to the same assignee, discloses a system that continuously performs mathematical calculations and applies a statistical analysis of sorts to ascertain the probability of sensor failure and means that would substitute for the failed sensor. Such a system is not only complex but is cumbersome to implement and at best it's a statistical approach to the correct answer.

We have found that we can increase failure tolerance of electronic controls by synthesizing burner pressure from the sensed engine and aircraft parameters upon failure of the actual burner pressure sensing system. This invention contemplates generating a calculated compressor inlet total pressure signal ($P_{T2}$) from aircraft Mach No. and altitude and multiplying it by the ratio of burner pressure to compressor inlet total pressure ($P_B/P_{T2}$) generated from sensed compressor inlet total temperature ($T_{T2}$) and sensed rotor speed ($N_1$) to synthesize burner pressure ($P_B$).

SUMMARY OF THE INVENTION

A feature of this invention is to provide for an electronic control for a gas turbine engine means for minimizing the effect of sensor failures and hence increasing the failure tolerance. As a feature of this invention, sensed engine parameters ($T_{T2}+N_1$) and aircraft parameters (altitude and Mach No.) having a particular thermodynamic relationship in the engine cycle to the parameter monitored by the failed sensor are calculated to produce a synthesized signal indicative of the signal otherwise created by the failed sensor had it not failed. This system is characterized as being continuously on line, simple to implement and highly reliable.

Other features and advantages will be apparent from the specification and claims and from the accompanying drawing which illustrate an embodiment of the invention.

BRIEF DESCRIPTION OF THE DRAWING

The sole FIGURE is a block diagram illustrating means for synthesizing the parameter produced by the failed sensor.

DESCRIPTION OF THE PREFERRED EMBODIMENT

It should be understood that this invention has application in all types of turbine power plants whether it be the axial flow multiple spool type as the F-100 manufactured by the Pratt & Whitney Aircraft division of United Technologies Corporation, or any other type. However, this invention is particularly effective in electronic controls for gas turbine engines. The parameters selected to be synthesized will depend on the parameters sensed by the engine control and the sophistication desired.

As noted in FIG. 1, burner pressure (PB) is continuously measured and utilized in its normal fuel control operation and upon sensor failure a synthesized (PB) signal will be utilized. A suitable failure detection circuit in the electronic control, as represented by box 10, will pass the measured $P_B$ signal so long as it has not failed. Failure of the measured parameter is determined by comparing the measured parameter with predetermined maximum and minimum normal operating limits. Any value of the measured parameter out of this normal operating range will be considered failed. If failed, the suitable select logic 12 will pass the synthesized PB signal upon receipt of a failure signal from the failure detection circuit box 10. As shown altitude and Mach No. of the aircraft are measured to calculate $P_{T2}$. Since the altitude and Mach No. are generally measured in modern day aircraft these signals are available and as such eliminate the need to sense actual $P_{T2}$. Thus realizing a cost savings in the necessary hardware to effectuate this measurement, thus the function generator 14 responding to altitude produces an ambient pressure signal $P_{amb}$. This signal together with the actual aircraft Mach No. are the inputs to function generator 16 which in turn produces the calculated $P_{T2}$ signal.

The $P_B/P_{T2}$ ratio is obtained from corrected speed by sensing $T_{T2}$ and converting it to its $\sqrt{\theta_{T2}}$ value by multiplying it by a temperature constant 1/518.69 and taking its square root in a well known manner. Compressor low rotor speed ($N_1$) is combined with this signal in divider 18 to obtain corrected rotor speed ($N_1/\sqrt{\theta_{T2}}$). This value is applied as the input to function generator 20 which produces the $P_B/P_{T2}$ ratio signal.

The multiplier 22 multiplies the $P_{T2}$ calculated signal and the $P_B/P_{T2}$ calculated signal whose product is the signal to be used to substitute for the failed PB signal. Since $N_1/\sqrt{\theta_{T2}}$ and $P_B/P_{T2}$ are both unique functions of engine thrusts and are mutually dependent, the synthesized PB signal becomes a valid parameter to be substituted for the measured PB parameter.

This synthesized signal is then utilized to perform all the functions of a measured burner pressure and hence establishes the proper levels for start, acceleration and deceleration schedules as well as providing limits for protecting the structural integrity of the engine's parts.

It should be understood that the invention is not limited to the particular embodiments shown and described herein, but that various changes and modifications may be made without departing from the spirit or scope of this novel concept as defined by the following claims.

We claim:

1. For a gas turbine engine having compressor and burner powering aircraft, means for providing a synthesized parameter of burner pressure to be substituted for a measured parameter of burner pressure in the event of failure of said measured parameter signal as determined by comparing the value of the measured signal with predetermined maximum and minimum normal operating limits of said signal comprising, a first function generator responding to Mach No. and altitude for producing a first signal indicative of the compressor inlet pressure, a second function generator responsive to compressor inlet temperature and compressor rotor speed for producing a second signal and means for combining said first signal and said second signal for producing an output signal whose value is approximate the failed measured parameter signal of burner pressure.

2. Means as in claim 1 wherein said combining means is a multiplier for multiplying said first signal by said second signal.

* * * * *